(12) United States Patent
Muresan

(10) Patent No.: US 7,961,232 B2
(45) Date of Patent: Jun. 14, 2011

(54) CALCULATING INTERPOLATION ERRORS FOR INTERPOLATION EDGE DETECTION

(75) Inventor: Darian Muresan, Arlington, VA (US)

(73) Assignee: LifeSize Communications, Inc., Austin, TX (US)

( * ) Notice: Subject to any disclaimer, the term of this patent is extended or adjusted under 35 U.S.C. 154(b) by 205 days.

(21) Appl. No.: 12/356,640

(22) Filed: Jan. 21, 2009

(65) Prior Publication Data
US 2009/0147109 A1    Jun. 11, 2009

Related U.S. Application Data

(63) Continuation of application No. 10/752,462, filed on Jan. 5, 2004, now Pat. No. 7,525,584.

(51) Int. Cl.
*H04N 9/64* (2006.01)
(52) U.S. Cl. .......................... 348/246; 348/247
(58) Field of Classification Search .................. 348/280, 348/311, 246, 247
See application file for complete search history.

(56) References Cited

U.S. PATENT DOCUMENTS

| | | | |
|---|---|---|---|
| 3,542,947 A | 11/1970 | Thurston | |
| 3,971,065 A | 7/1976 | Bayer | |
| 4,642,678 A | 2/1987 | Cok | |
| 4,774,565 A | 9/1988 | Freeman | |
| 5,038,216 A * | 8/1991 | Easterly et al. | 348/364 |
| 5,347,599 A * | 9/1994 | Yamashita et al. | 382/278 |
| 5,373,322 A | 12/1994 | Laroche et al. | |
| 5,506,619 A | 4/1996 | Adams, Jr. et al. | |
| 5,528,274 A * | 6/1996 | Hyodo | 347/172 |
| 5,528,740 A | 6/1996 | Hill et al. | |
| 5,579,053 A * | 11/1996 | Pandel | 348/448 |
| 5,617,539 A | 4/1997 | Ludwig et al. | |
| 5,629,734 A * | 5/1997 | Hamilton et al. | 348/222.1 |
| 5,652,621 A | 7/1997 | Adams, Jr. et al. | |
| 5,654,759 A | 8/1997 | Augenbraun et al. | |
| 5,661,525 A * | 8/1997 | Kovacevic et al. | 348/452 |
| 5,689,641 A | 11/1997 | Ludwig et al. | |
| 5,719,540 A | 2/1998 | Takaoka et al. | |
| 5,751,338 A | 5/1998 | Ludwig, Jr. | |
| 5,757,424 A | 5/1998 | Frederick | |
| 5,805,216 A * | 9/1998 | Tabei et al. | 348/246 |
| 5,831,666 A | 11/1998 | Palmer et al. | |
| 5,832,143 A * | 11/1998 | Suga et al. | 382/300 |

(Continued)

OTHER PUBLICATIONS

Joe Duran and Charlie Sauer; "Mainstream Videoconferencing—A Developer's Guide to Distance Multimedia"; Jan. 1997; pp. 228-230; Addison Wesley Longman, Inc.

(Continued)

*Primary Examiner* — Lin Ye
*Assistant Examiner* — Amy Hsu
(74) *Attorney, Agent, or Firm* — Meyertons Hood Kivlin Kowert & Goetzel, P.C.; Jeffrey C. Hood

(57) ABSTRACT

An edge directed demosaicing algorithm for determining an edge direction from an input color filter array (CFA) sampled image is disclosed. Aspects of the present invention include calculating for a current missing green pixel, interpolation errors in an East-West (EW) direction at known neighboring green pixels, and averaging the EW interpolation errors to obtain an EW error. Interpolation errors are also calculated for the current missing green pixel in a North-South (NS) direction at known neighboring green pixels, and the NS interpolation errors are averaged to obtain a NS error. An EW or NS direction indicated by a minimum of the EW error and the NS error is then selected as the edge direction.

15 Claims, 8 Drawing Sheets

U.S. PATENT DOCUMENTS

| | | | |
|---|---|---|---|
| 6,043,844 | A | 3/2000 | Bist et al. |
| 6,173,069 | B1 | 1/2001 | Daly et al. |
| 6,301,370 | B1 | 10/2001 | Steffens et al. |
| 6,563,537 | B1 * | 5/2003 | Kawamura et al. ........... 348/252 |
| 6,594,688 | B2 | 7/2003 | Ludwig et al. |
| 6,614,474 | B1 | 9/2003 | Malkin et al. |
| 6,642,960 | B1 * | 11/2003 | Kohashi et al. ............... 348/246 |
| 6,697,107 | B1 * | 2/2004 | Hamilton et al. ............. 348/234 |
| 6,717,578 | B1 | 4/2004 | Deering |
| 6,816,904 | B1 | 11/2004 | Ludwig et al. |
| 6,836,572 | B2 * | 12/2004 | Ishiga et al. .................. 382/300 |
| 6,850,565 | B2 | 2/2005 | Martins et al. |
| 6,965,705 | B1 * | 11/2005 | Ma et al. ....................... 382/300 |
| 7,006,686 | B2 * | 2/2006 | Hunter et al. ................. 382/162 |
| 7,035,481 | B2 * | 4/2006 | Kim et al. ..................... 382/300 |
| 7,088,392 | B2 * | 8/2006 | Kakarala et al. ............. 348/272 |
| 7,130,446 | B2 | 10/2006 | Rui et al. |
| 2003/0174146 | A1 | 9/2003 | Kenoyer |
| 2004/0183897 | A1 | 9/2004 | Kenoyer et al. |

OTHER PUBLICATIONS

"A history of videoconferencing (VC) technology" http://web.archive.org/web/20030622161425/http://myhome.hanafos.com/~soonjp/vchx.html (web archive dated Jun. 22, 2003); 5 pages.

"Mediamax Operations Manual"; May 1992; 342 pages; VideoTelecom; Austin, TX.

"Multimax Operations Manual" Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Elan Amir, Steven McCanne, and Hui Zhang; "An Application Level Video Gateway"; In Proceedings of ACM Multimedia '95; 1995; 18 pages.

"Polycom Demonstrates High Definition (HD) Video on Industry Leading VSX Video Communications Platform"; Apr. 26, 2005; 2 pages.

Tim Hewson, Cliff McKnight, Anne Clarke, and Peter Marsh; "Video Communication"; Desktop Video AGOCG Report; Feb. 24, 1999; 48 pages.

Bill Birney and David Workman; "Determining the Shape of Pixels and Frames"; May 2003; 15 pages; Microsoft Corporation.

Paul Bourke; "YCC colour space and image compression"; Apr. 2000; 7 pages.

Fredo Durand and Julie Dorsey; "Fast Bilateral Filtering for the Display of High-Dynamic-Range Images"; International Conference on Computer Graphics and Interactive Techniques; 2002; pp. 257-266.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Jefferson Han and Brian Smith; "CU-SeeMe VR Immersive Desktop Teleconferencing"; Proceeding of the Fourth ACM international conference on Multimedia; 1997; pp. 199-207.

Tohru Noshi, Kenjiro Mori, Yasuhiro Takahashi Yoshiyuki Nakayama, and Takeshi Ishizaki; "B-ISDN Multimedia Communication and Collaboration Platform Using Advanced Video Workstations to Support Cooperative Work"; IEEE Journal on Selected Areas in Communications; Dec. 1992; pp. 1403-1412; vol. 10, No. 9.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

D. Darian Muresan and Thomas M. Parks; "Optimal Recovery Demosaicing"; The IASTED Conference on Signal and Image Processing; 2002; 6 pages.

Roderick E. Perkins; "Spider: Investigation in Collaborative Technologies and Their Effects on Network Performance"; Global Telecommunications Conference; Dec. 1991; pp. 2074-2080; vol. 3.

Nicolas Roussel and Michel Beaudouin-Lafon; "VideoSpace: A Toolkit for Building Mediaspaces"; 1999; 11 pages.

Fred Sammartino and Dean Blackketter; "Desktop Multimedia Communications—Breaking the Chains"; 1991; 5 pages; Advanced Technology Group Apple Computer, Inc.

Scott R. Sharer; "What-Is 'HD'/'Hi-Def'"; Tandberg presentation; Aug. 2005; 43 pages.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

"Polycom Executive Collection"; Jun. 2003; 4 pages; Polycom, Inc.; Pleasanton, CA.

D. Darian Muresan and Thomas W. Parks; "Optimal Recovery Demosaicing"; 2002, 6 pages.

* cited by examiner

CALCULATING INTERPOLATION ERRORS FOR INTERPOLATION EDGE DETECTION

PRIORITY CLAIM

This application is a continuation of Ser. No. 10/752,462 titled "Fast Edge Directed Demosaicing" and filed Jan. 5, 2004, now U.S. Pat. No. 7,525,584, whose inventor was Darian Muresan and which is hereby incorporated by reference in its entirety as though fully and completely set forth herein.

FIELD OF THE INVENTION

The present invention relates to the processing of digital images obtained by interpolating image data from a charged coupled device (CCD) having a color filter array (CFA), and more particularly, to a method for determining a direction in the array in which to perform interpolation.

BACKGROUND OF THE INVENTION

Color images in single chip digital cameras are obtained by interpolating mosaiced color samples. These samples are encoded in a single chip CCD by sampling the light after it passes through a color filter array (CFA) that contains different color filters (i.e. red, green, and blue) placed in some pattern. Methods for interpolating the missing sensor values are referred to as "demosaicing," although it may also be referred to as "interpolation."

FIG. 1 is a diagram illustrating an example color filter array (CFA). One common type of CFA is a Bayer array 1, which uses red (R), green (G), and blue (B) filters arranged in a pattern that assigns twice as many green pixels as red or blue pixels. Light passing through the array 1 results in the CCD capturing a green (G) plane, and red (R) plane, and a blue (B) plane. Each pixel location requires three separate color values, but only one color value is captured for each pixel location. The G plane contains half of the pixels, the R plane contains one-fourth of the pixels, and the B plane contains one-fourth of the pixels.

The resulting sparsely sampled images of the three-color planes are interpolated to obtain dense images of the three-color planes and, thus, the complete color image. Each green pixel needs a red and a blue value, each red pixel needs a green and a blue value, and each blue pixel needs a red and a green value. Interpolation usually introduces color artifacts (color moiré patterns) due to the phase shifted, aliased signals introduced by the sparse sampling of the CFAs. The challenge of interpolation is determining how to construct the missing pixel values from the known pixel values. The most basic demosaicing idea is to linearly and independently interpolate the R, G, and B planes. This type of interpolation, which is called linear interpolation, introduces serious aliasing artifacts. For example, interpolating a missing pixel by simply averaging the two closest pixels of a similar color may work quite well with many images, but if the image has any objects with sharp edges, color artifacts appear around the edges.

In recent years there has been a lot of interest in developing better demosaicing algorithms. In particular, the problem has been tackled from different angles including neural networks, B-splines, linear, minimized mean square estimators, frequency domain interpolators, gradient based methods, adaptive horizontal or vertical interpolation decisions, and a wide range of edge directed algorithms. One approach for improving interpolation attempts to do so by improving how to determine which direction in the image to follow when performing interpolation.

One specific example of such approach is U.S. Pat. No. 5,629,734 entitled "Adaptive Color Plan Interpolation In Single Sensor Color Electronic Camera," issued to Hamilton et al. on May 13, 1997. The Hamilton patent describes a particular interpolation algorithm for estimating red, blue and green values for each color sensor location, or pixel. The algorithm uses Laplacian second-order values and gradient values to produce a classifier for each pixel, which are then used to indicate a preferred orientation (e.g., horizontal or vertical) for the interpolation of missing color values at each pixel. The Laplacian second-order values used to define the classifier, in turn, are determined from nearby pixels within the same row and column as the current pixel having the missing color values. For images with horizontal and vertical edges, missing green pixels are adaptively interpolated either horizontally, vertically or two-dimensionally depending upon the gradient established between the chrominance (red and blue) pixel locations in the vertical and horizontal directions around the missing green pixel.

Although the Hamilton algorithm may improve interpolation results in some images, the method for determining the interpolation direction by detecting local edges using gradients, suffers from being inaccurate and requiring significant processing time.

From a hardware point of view, Foveon™ of Santa Clara, Calif., solved the demosaicing problem by introducing the X3 image sensor which captures all three primary colors eliminating the need for demosaicing. However, the X3 sensor has not crossed every technical hurdle. Issues such as cross-talk between different colors are still a problem. With good DSP technology demosaicing will continue to play a role in the future of digital cameras, especially in low end cameras, such as those found in today's cell phones, and video.

Accordingly, what is needed is an improved method for interpolating unknown color values for pixels from known pixels values in an image by providing an improved method for determining an interpolation direction across the image. The present invention addresses such a need.

BRIEF SUMMARY OF THE INVENTION

A computer-implemented method for determining an edge direction from an input color filter array (CFA) sampled image is disclosed. Aspects of the present invention include calculating for a current missing green pixel, interpolation errors in an East-West (EW) direction at known neighboring green pixels, and averaging the EW interpolation errors to obtain an EW error. Interpolation errors are also calculated for the current missing green pixel in a North-South (NS) direction at known neighboring green pixels, and the NS interpolation errors are averaged to obtain a NS error. An EW or NS direction indicated by the minimum of the EW error and the NS error is then selected as the edge direction.

According to the method and system disclosed herein, the present invention introduces a non-linear interpolation scheme based on image edge information that produces high quality visual results and it is extremely fast, requiring only shifts, adds, and no multiplications or divisions. The new method is especially good at reconstructing the image around image edges, a place where the visual human system is most sensitive.

BRIEF DESCRIPTION OF THE DRAWINGS

FIG. 10 depicts a local patch of any image, where pixel 50 is a pixel the algorithm is currently processing.

DETAILED DESCRIPTION OF THE INVENTION

Figure 1:
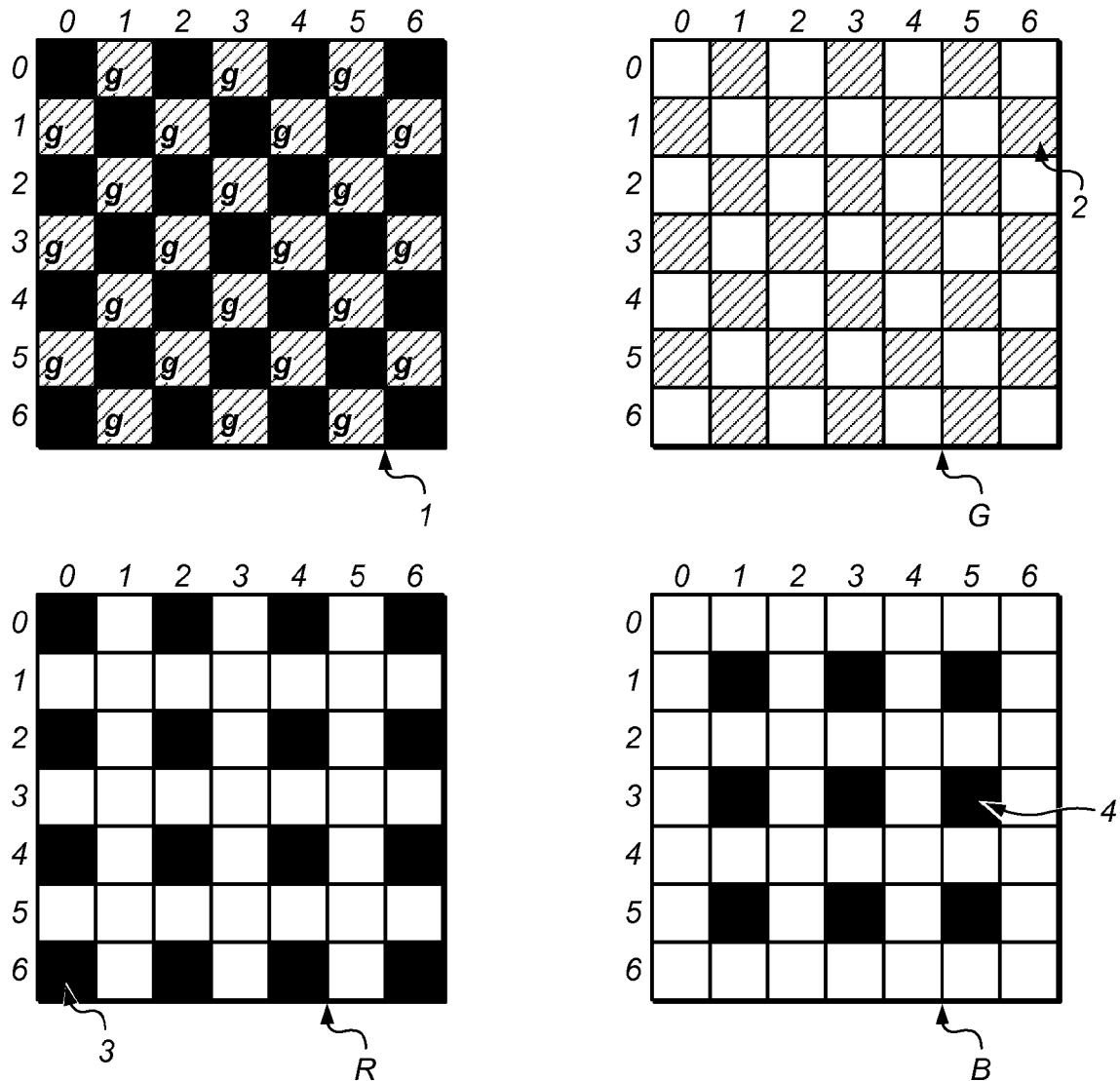
FIG. 1 depicts the image recorded by a single CCD camera after light passes through a Bayer (1) CFA [BAYER]. The red (R), green (G), and blue (B) channels are interpolated to obtain the full color image.

The present invention relates to a method for demosaicing. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein. The methods described herein may be implemented as program instructions stored on a non-transitory, computer readable storage medium. More particularly, these program instructions may be executable by a processor to perform the described methods.

This present invention provides a non-linear demosaicing algorithm. The non-linear demosaicing algorithm of the present invention produces good visual results when compared against those obtained by linear demosaicing and other published algorithms mentioned above. The advantage of this invention is not only the improved demosaicing results, but also the extremely low computational costs. The demosaicing scheme presented here requires only additions, shifts, and comparisons.

Before delving into the detailed description of the invention, the labeling and notation convention used throughout the invention is presented.

A pixel value is referenced by: the color plane and the (row, column) parenthesis, where the row index increases from top to bottom and the column index increases from left to right. For example, in FIG. 1, pixel (2) is referenced as G(1,6), pixel (3) is R(6,0), and pixel (4) is B(3,5).

The location of any pixel is referenced by the (row, column) coordinates. For example, pixel (2) is at location (1,6).

Each color plane of a captured image forms a surface that is continuously varying in each direction. Several directions hold more interest than others, especially in terms of the directions of edges within the image. Horizontal and vertical directions are very important, as are the two major diagonals. For explanatory purposes, the concept of compass directions will be used to describe these directions. North-South (NS) and East-West (EW) are vertical and horizontal directions, respectively, and Northeast (NE), and Northwest (NW) are the 45 and 135 degrees diagonal directions, respectively. These four directions are a rough discretization of all the possible edge directions.

The edge direction of any pixel is noted using ED(row, column). For example, for pixel (2) shown in FIG. 1 we could have ED(1,6)=EW and this would mean that the edge direction at pixel (2) was in the EW direction.

The interpolation errors in the EW, NE, NS, and NW directions are labeled as EWE, NEE, NSE, and NWE respectively.

Linear demosaicing suffers from the decoupling of the R, G, and B planes. The red, green, and blue planes are very similar. Each plane depicts very similar images and each plane separately is a good representation of the gray scale image, especially if all the objects in the image have all three colors. Therefore, it is a valid assumption that object boundaries are the same in all three-color planes, or that the high frequency components (edges depicting object boundaries) are similar in all three planes and equal with the high frequency component of the green plane. Given that interpolation errors occur in high frequency regions, it is known that it is better to interpolate the difference between red and green and blue and green than to interpolate the red and blue planes separately.

The present invention provides an edge directed demosaicing algorithm. The algorithm determines the best linear interpolation direction out of four possible directions: EW (horizontal), NE (45 degrees), NS (vertical), and NW (135 degrees) by determining the direction of the local edge present in the image. The local edge direction is the direction in which interpolation (preferably linear interpolation) makes the smallest errors. The assumption is that more errors will occur by performing linear interpolation across an edge, rather than performing linear interpolation along the edge.

The algorithm of the present invention estimates the best direction using the green plane. For a current missing green pixel, interpolation errors are calculated for missing green pixels in the East-West direction using only known neighboring green pixels, and averaging these errors. Interpolation errors are also calculated for the missing green pixel in the North-South direction using only known neighboring green pixels, and averaging these errors. The direction with the minimum error is chosen as the local edge direction, and therefore the local interpolation direction for the missing green pixel. Using the estimate for the edge direction from the green plane, the red and blue planes are interpolated by performing linear interpolation on the difference R-G and B-G in the estimated direction.

Figure 2:
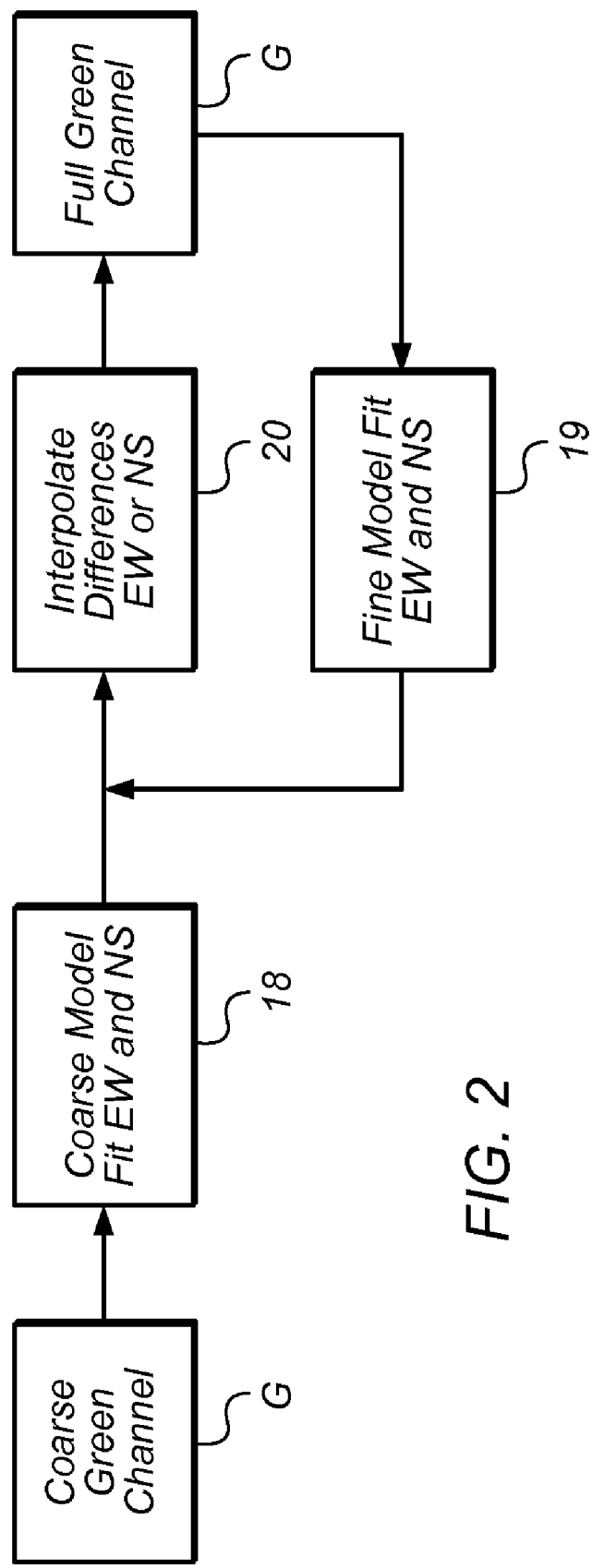
FIG. 2 represents the flowchart for interpolating the green channel.
Figure 5:
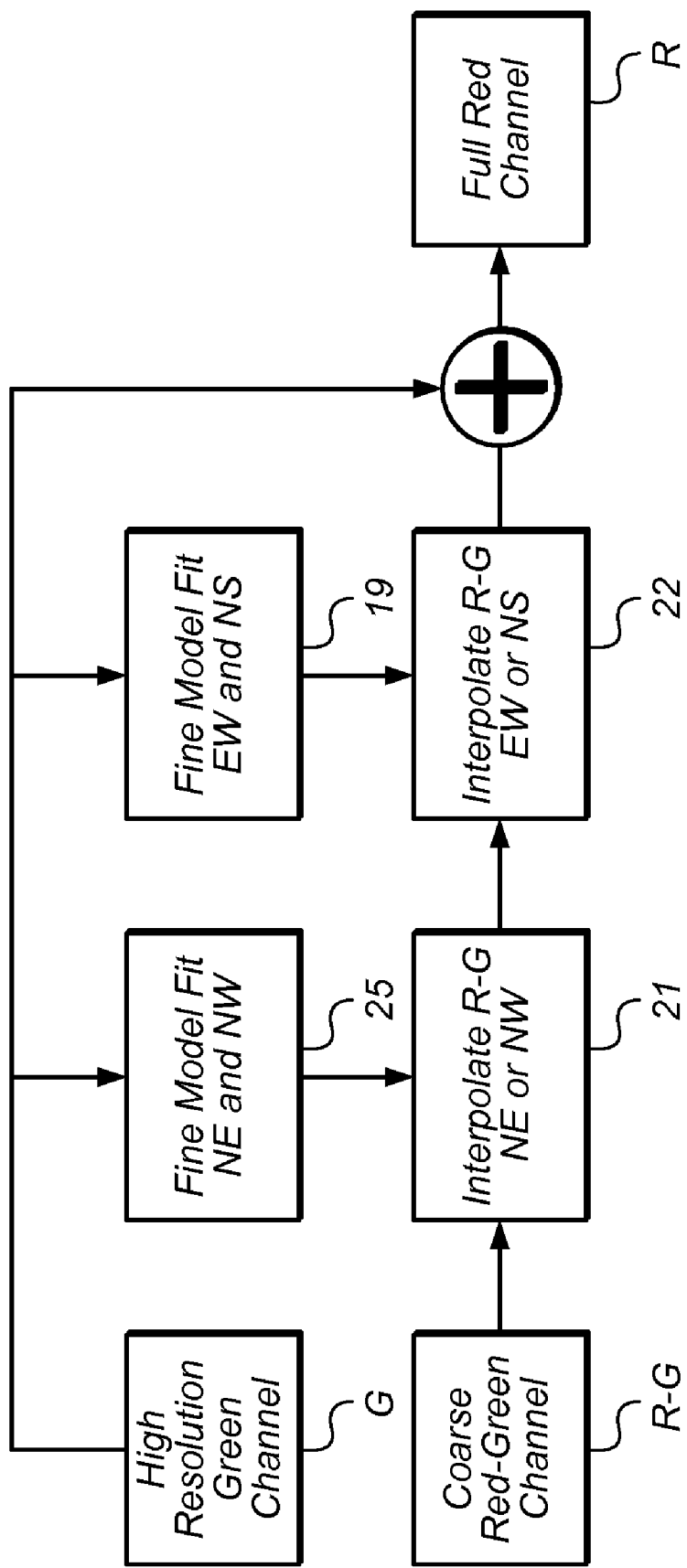
FIG. 5 represents the flowchart for interpolating the red channel. The interpolation procedure for the blue channel is the same as for the red channel. Therefore, the invention discusses only the interpolation of the red channel.

FIGS. 2 and 5 illustrate flow diagrams of the demosaicing algorithm in accordance with the present invention. FIG. 2 illustrates the process of interpolating the green channel, and FIG. 5 illustrates the process of interpolating the red and blue channels by interpolating the differences red-green and blue-green.

Referring now to FIG. 2, the demosaicing algorithm begins with the G plane of a CFA (hereinafter, coarse green channel) to find all the missing green pixels (shown as white pixels in G in FIG. 1).

Figure 8:
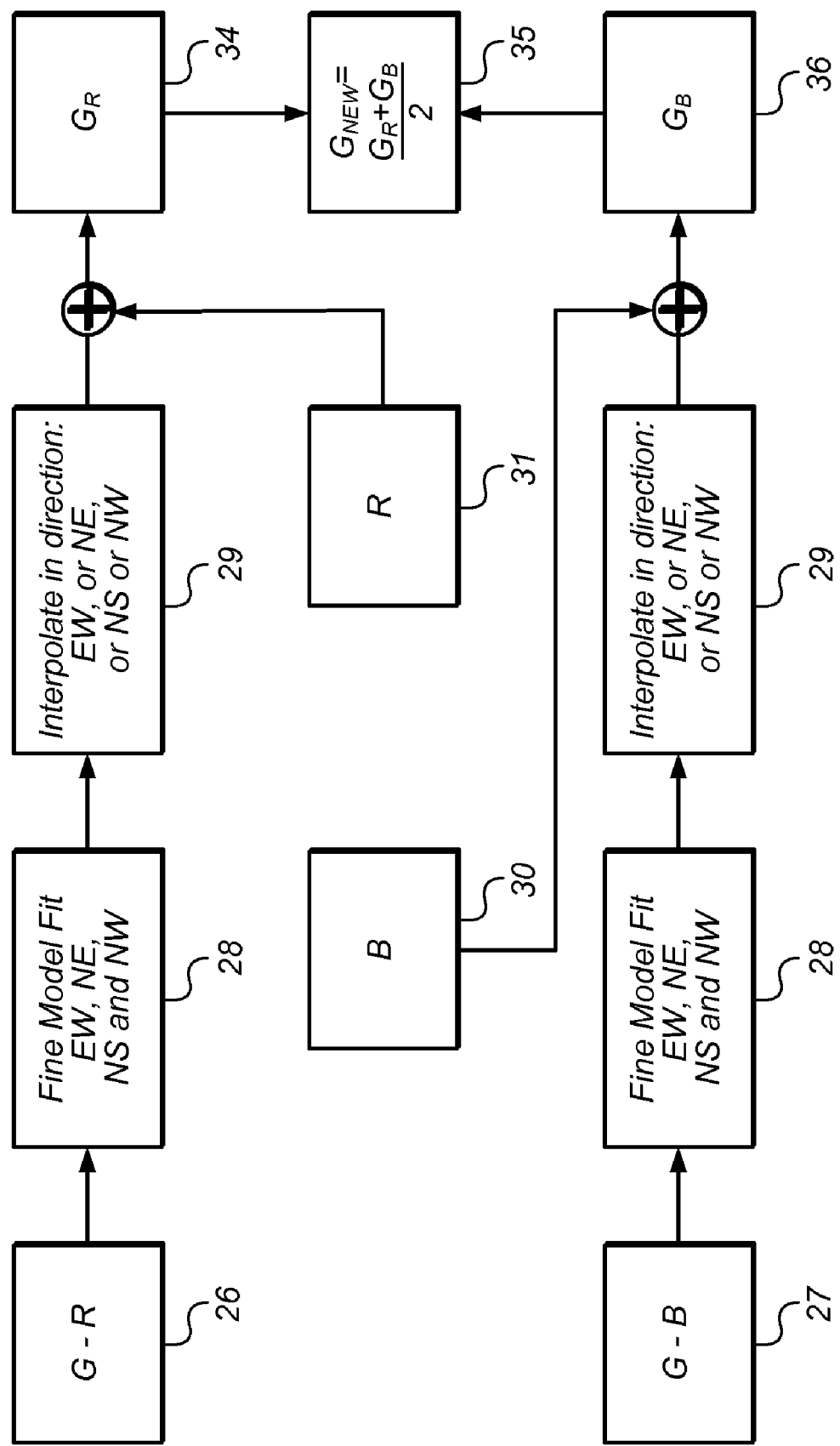
FIG. 8 shows the flowchart for the green color correction step using full density red, green, and blue channels.
Figure 9:
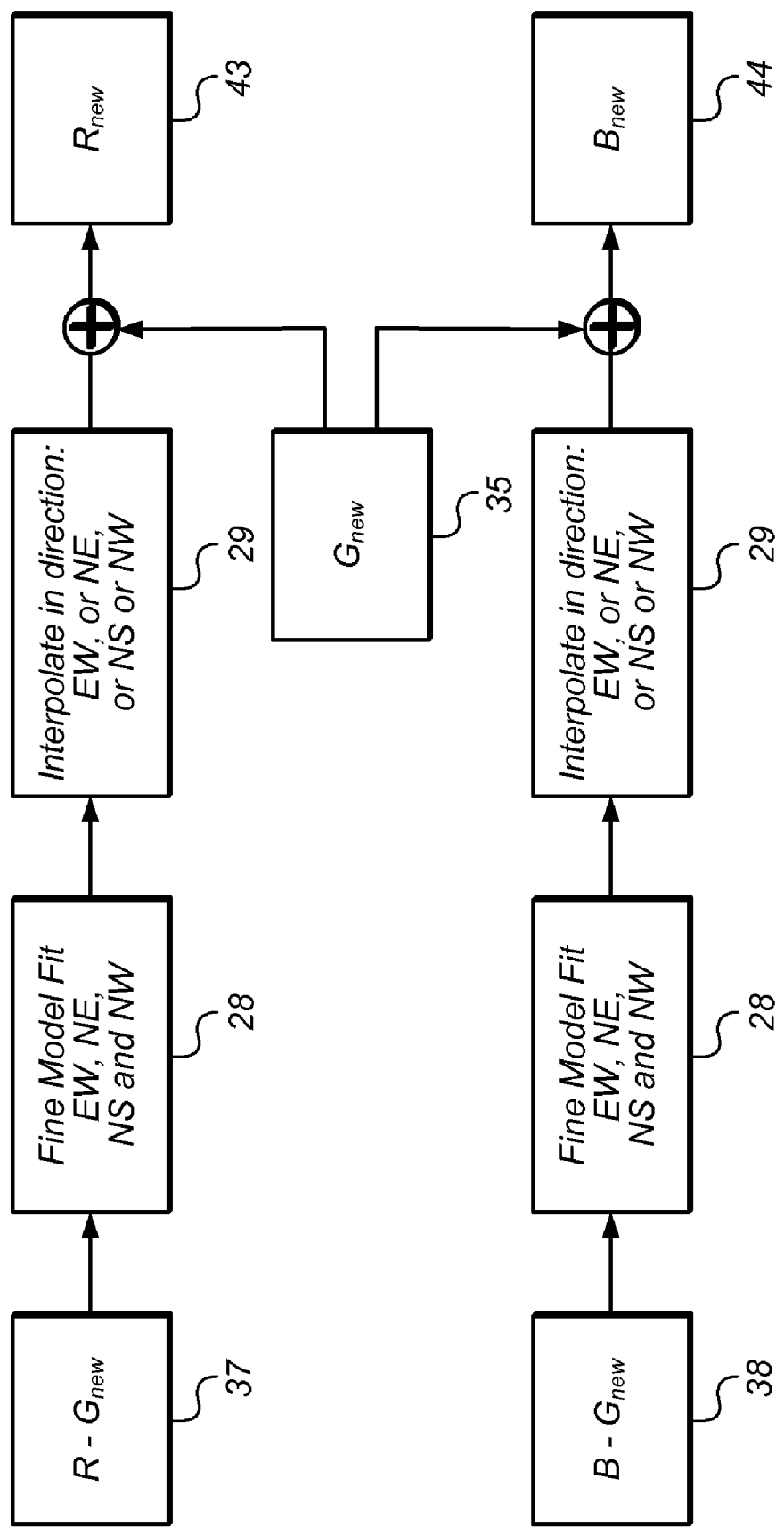
FIG. 9 shows the flowchart for the red and blue color correction step after the red, and blue channels are interpolated and the green channel has been corrected.

1. Interpolate the green channel.
   a. Coarse Model Fit EW and NS. The first step 18 is to estimate the direction of the local edge by calculating linear interpolation errors in NS and EW directions using coarse scale data, hence the phrase "coarse model fit EW and NS." The interpolation errors provide a measure of the best direction for linear interpolation and are proportional with the directions of the local edge present in the image. In a preferred embodiment, depending on the size of the image, the course scale data refers to an approximately 7×7 neighborhood around a missing pixel.
   b. Interpolate Differences EW or NS. In step 20, for missing red and blue locations in the green channel the algorithm linearly interpolates differences Green-Red, or Green-Blue, respectively, in the direction having the least amount of absolute error (i.e., the EW or NS direction determined in the step 1a above). Missing blue pixels in green pixel locations are estimated using linear interpolation of the blue pixels in the blue channel in the selected edge direction; and missing red pixels in green pixel locations are estimated using linear interpolation of the red pixels in the red channel in the selected direction. This step results in a full interpolated green channel G in which all missing green pixels have an interpolated value. Although in a preferred embodiment, linear interpolation is used, those with ordinary skill in the art will readily recognize that any type of interpolation may be used.
   c. Optional: Fine Model Fit EW and NS. In step 19, the algorithm optionally uses the full green channel to calculate linear interpolation errors in NS and EW directions using fine scale data. The errors provide a measure of the best direction for linear interpolation and are proportional with the directions of the local edge. If number of iterations is reached stop, else the algorithm returns to step (b). In a preferred embodiment, fine scale data refers to a 3×3 pixel neighborhood.
2. After the green channel is interpolated, the algorithm interpolates the red and blue channels. The steps are identical to those described for the green channel, except that instead of interpolating red and blue channels, the algorithm interpolates the differences; red minus green, and blue minus green. Subtracting the green channel from the red channel is performed by, subtracting from each red pixel location in R, a green pixel in G at the same location. FIG. 5 is a flow diagram illustrating interpolation of the red channel. The steps for the blue channel are similar.
   a. Model Fit NE and NW. In step 25, the algorithm calculates linear interpolation errors in NE and NW directions using the full green channel G.
   b. Interpolate Differences NE or NW. In step 21, the algorithm, linearly interpolates the differences red-green (and blue-green) in the NE or NW direction based on the least amount of absolute interpolation error. This results in a new sampling grid, which is a quincunx grid, as depicted in FIG. 7.
   c. Model Fit EW and NS. In step 19, the algorithm calculates linear interpolation errors in NE and NW directions using the full green channel G.
   d. Interpolate Differences EW or NS. In step 22, the algorithm linearly interpolates the differences red-green (and blue-green) in the EW or NS direction based on the least amount of absolute interpolation error. The end of the process is to add the green channel back to obtain the full red or blue image.
3. Optionally, correct the red, green, and blue channels by forcing the difference red-green, green-red, blue-green, and green-blue to be constant throughout an object (FIG. 8 and FIG. 9).
   a. Fix Green. Estimate the new green channel as shown in FIG. 8.
   b. Fix Blue and Red. Estimate the new blue and red channels as shown in FIG. 9. If the number of iterations is reached stop, else go to (a).

The demosaicing algorithm is explained in further detail below.

Green Channel Interpolation

Figure 3:
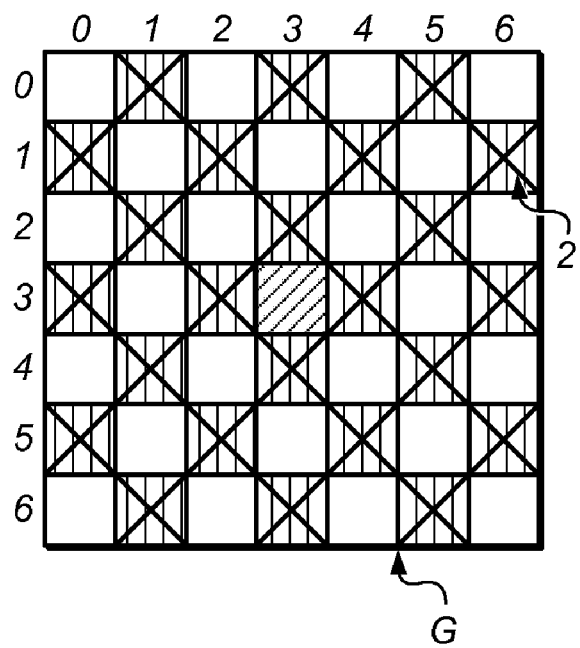
FIG. 3 depicts the green channel as recorded by the CCD and before interpolation. The known green pixels 7 are marked with an X, the missing pixels 8 are white, and the pixels currently processed 9 are gray.

Referring again to FIG. 2, the interpolation steps for the green channel are shown. Starting with the CFA green channel (G) the algorithm estimates the direction of the local edge in step (18). FIG. 3 depicts the green channel as recorded by the CCD and before interpolation. The known green pixels 7 are marked with an X, the missing green pixels 8 are white, and the pixel currently being processed 9 is gray. Referring again to FIG. 2, the algorithm then interpolates the G-B or G-R in step (20) to obtain an initial estimate for the missing green pixels 8 to provide the full green channel.

Figure 4:
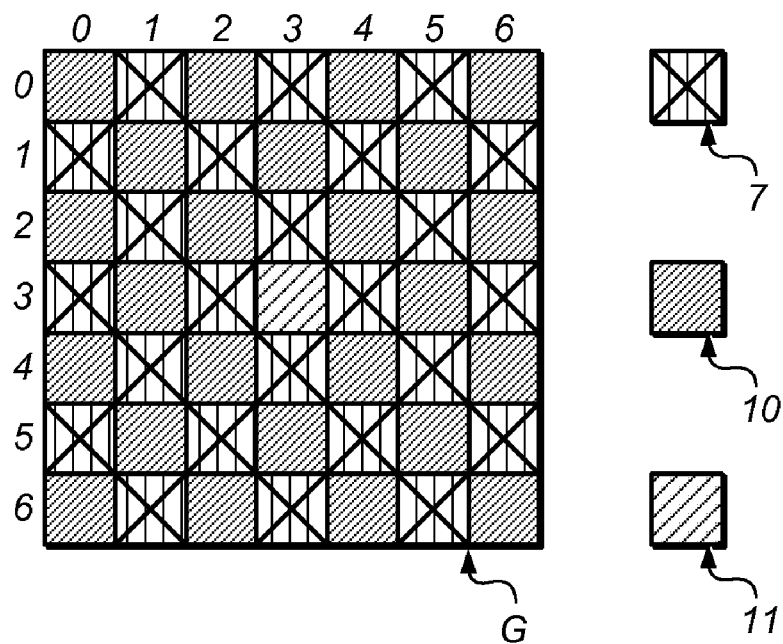
FIG. 4 depicts the green channel after the first interpolation step is complete. In the optional iteration step the original CCD pixels 7 are marked by an X, the interpolated pixels 10 are green and the pixels currently processed 11 are gray.

FIG. 4 depicts the green channel after the first interpolation step is complete. In the optional iteration step 19 the original CCD pixels 7 are marked by an X, the interpolated pixels 10 are shaded but without an X, and the pixel currently processed 11 is gray. Better demosaicing results can be obtained by recalculating the local edge direction using the full high-density green plane (FIG. 4) and repeating step (20) several times. The mathematical details are presented next.

Coarse Model Fit EW and NS (18)

In FIG. 3, the local edge direction (EW or NS) must be estimated at each missing green pixel 8. In order to keep the discussion clear, the procedure discussed will estimate the edge direction at the center pixel 9 at G(3,3). The procedure for all the other missing pixels is identical. The first step is to estimate the EW and NS errors at neighboring known pixel 7 by calculating directional linear interpolation errors. For example, at pixel G(3,4) the EW error (EWE) and NS error (NSE) are:

$$EWE(3,4)=abs(G(3,2)+G(3,6)-2\times G(3,4)) \quad (E\text{-}1)$$

$$NSE(3,4)=abs(G(1,4)+G(5,4)-2\times G(3,4)) \quad (E\text{-}2)$$

The EW and NS errors at current pixel 9 are estimated by averaging out the errors the nearest known pixels 7:

$$EWE(3,3)=EWE(2,3)+EWE(3,4)+EWE(4,3)+EWE(3,2) \quad (E\text{-}3)$$

$$NSE(3,3)=NSE(2,3)+NSE(3,4)+NSE(4,3)+NSE(3,2) \quad (E\text{-}4)$$

Note, the average in this example could be obtained by division by 4. However, division by 4 is only a scaling factor. If all "averages" are calculated without the division by 4 then the same results are obtained as if all averages were computed with the division by 4. Since speed is an issue, the scaling factor of ¼ is preferably left out.

Finally, the estimated direction at the missing pixel G(3,3) (denoted as ED(3,3)) is:

IF(NSE(3,3)<EWE(3,3))
ED(3,3)=NS
ELSE
ED(3,3)=EW

Next, the algorithm interpolates in the direction of the local edge.

Interpolate Differences EW or NS (20)

From the previous step (18) the edge direction (NS or EW) is known for each missing pixel (8). The algorithm interpolates the difference image G-R (if the CFA at location (3,3) is red) or G-B (if the CFA at location (3,3) is blue) in the ED(3,3) direction. Without loss of generality, assume that the CFA (1) has a blue pixel at index location (3,3) and that ED(3,3)=EW. The linear interpolation of G-B in the EW direction is:

$$G(3,3) - B(3,3) = \frac{G(3,2) - B(3,2)}{2} + \frac{G(3,4) - B(3,4)}{2} \quad (E-5)$$

The blue pixels at locations (3,2) and (3,4) are not known and it is assumed that they are linearly interpolated from the neighboring blue pixels such that:

$$B(3,2) = \frac{B(3,1) + B(3,3)}{2} \quad (E-6)$$

$$B(3,4) = \frac{B(3,3) + B(3,5)}{2} \quad (E-7)$$

Equation (E-5) then becomes $$G(3,3) = \frac{G(3,2) - B(3,2)}{2} + \frac{G(3,4) - B(3,4)}{2} + B(3,3) \quad (E-8)$$

$$= -\frac{B(3,1)}{4} + \frac{G(3,2)}{2} + \frac{B(3,3)}{2} + \frac{G(3,4)}{2} - \frac{B(3,5)}{4} \quad (E-9)$$

By a similar argument, if the interpolation direction had been NS, the interpolation would be:

$$G(3,3) = -\frac{B(1,3)}{4} + \frac{G(2,3)}{2} + \frac{B(3,3)}{2} + \frac{G(4,3)}{2} - \frac{B(5,3)}{4} \quad (E-10)$$

Optional: Fine Model Fit EW and NS (19)

After all the initial green pixels are interpolated by going through step (20) for the first time, the algorithm's performance can be increased by re-estimating the local edge direction as in step (18) but this time using the higher density sampling grid. In FIG. 4, to estimate the direction of the center pixel (11) the directions in the neighboring region of (11) are averaged out. For example, assume that the region is 3×3 centered at (11). The EW and NS errors at pixel G(2,2) are:

$$EWE(2,2) = abs(G(2,1) + G(2,3) - 2 \times G(2,2)) \quad (E-11)$$

$$NSE(2,2) = abs(G(1,2) + G(3,2) - 2 \times C(2,2)) \quad (E-12)$$

and similarly for all the pixels at locations (2,3), (2,4), (3,2), (3,3), (3,4), (4,2), (4,3), and (4,4). Similar to (18) the final errors at location (3,3) are $$EWE(3,3) = \sum_{i=2}^{4} \sum_{j=2}^{4} EWE(i,j) \quad (E-13)$$

$$NSE(3,3) = \sum_{i=2}^{4} \sum_{j=2}^{4} NSE(i,j) \quad (E-14)$$

As in (18) the estimated direction at the missing pixel G(3,3) is:
IF(NSE(3,3)<EWE(3,3))
ED(3,3)=NS
ELSE
ED(3,3)=EW It helps if the first time through step (19), the algorithm uses a larger averaging area to estimate the local direction and in additional passes it uses a smaller area. The larger area helps the algorithm lock in on strong edge trends, while the smaller area helps the algorithm adjust to small edge fluctuations.

Red and Blue Channel Interpolation

The interpolation procedure for the red channel is the same as for the blue channel. The red channel interpolation steps are depicted in FIG. 5. As described above, the algorithm estimates the interpolation directions from the green channel in steps (25 and 19) and then interpolates the difference R-G in the estimated direction in steps (21 and 22). The detailed steps are presented next.

Model Fit NE and NW (25) and Interpolate NE or NW (21)

Figure 6A:
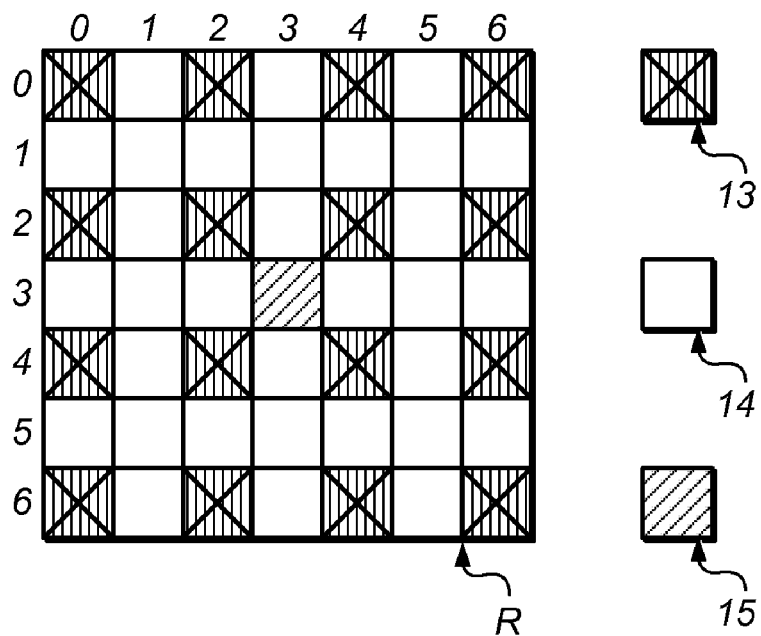
FIG. 6A depicts the red channel (R) which contains: original CCD pixels (13) marked by an X, missing pixels 14 that are white, and pixels that are being processed 15 and which are gray.
Figure 6B:
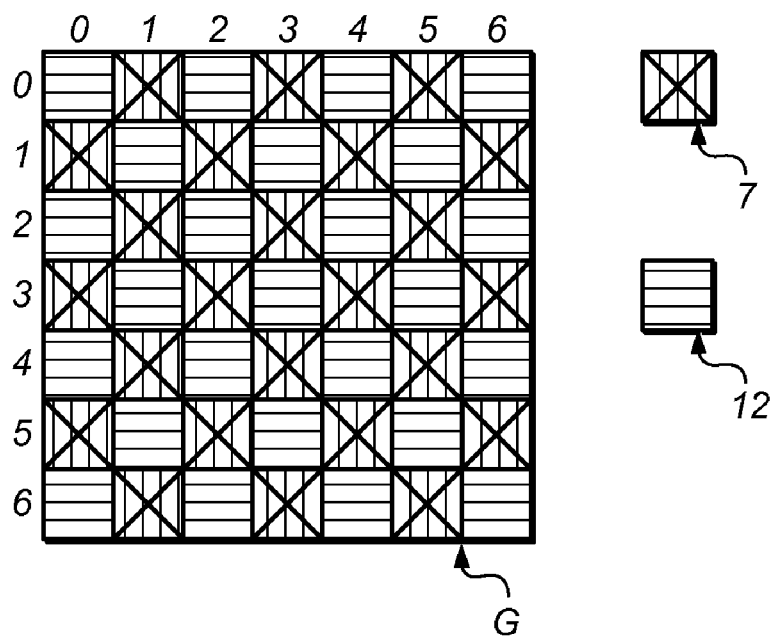
FIG. 6B also shows the interpolated green channel (G) with the original pixels 7 and the interpolated pixels 12.

FIG. 6A depicts the red channel (R), which includes: original red CCD pixels 13 marked by an X, missing pixels 14 are white, and the pixel being processed 15, which is gray. FIG. 6B shows the interpolated green channel (G) with the original pixels 7 and the interpolated pixels 12.

In FIG. 6A the local edge direction at pixel 15, the red at location R(3,3) must be estimated. The NE and NW directions at (3,3) are estimated by averaging out the NE and NW direction around the pixel G(3,3). For example, assume that the averaging region is 3×3 centered at R(3,3). The NE and NW errors at pixel G(2,2) are:

$$NEE(2,2) = abs(G(1,3) + G(3,1) - 2 \times G(2,2)) \quad (E-15)$$

$$NWE(2,2) = abs(G(1,1) + G(3,3) - 2 \times G(2,2)) \quad (E-16)$$

and similarly for all the pixels at locations (2,3), (2,4), (3,2), (3,3), (3,4), (4,2), (4,3), and (4,4). Similar to 18 the final errors at location (3,3) are $$NEE(3,3) = \sum_{i=2}^{4} \sum_{j=2}^{4} NEE(i,j) \quad (E-17)$$

$$NWE(3,3) = \sum_{i=2}^{4} \sum_{j=2}^{4} NWE(i,j) \quad (E-18)$$

As in (18) the estimated edge direction at the missing pixel R(3,3) is:
IF(NEE(3,3)<NWE(3,3))
ED(3,3)=NE
ELSE
ED(3,3)=NW Once the diagonal direction is determined, interpolation is applied to the difference R-G. For example, if the direction is NE then interpolation becomes:

$$R(3,3) - G(3,3) = \frac{R(2,4) - G(2,4)}{2} + \frac{R(4,2) - G(4,2)}{2} \quad \text{(E-19)}$$

$$R(3,3) = \frac{R(2,4) - G(2,4)}{2} + \frac{R(4,2) - G(4,2)}{2} + G(3,3) \quad \text{(E-20)}$$

Figure 7A:
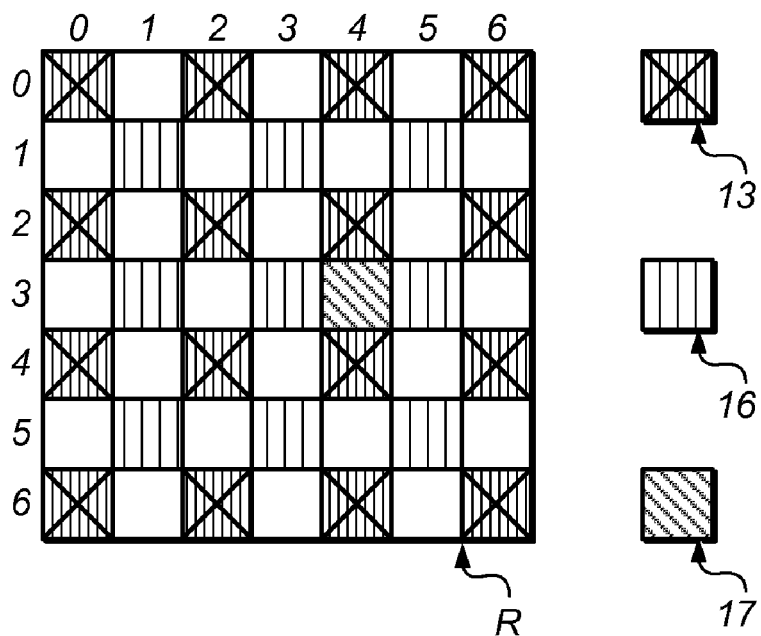
FIG. 7A depicts the red channel (R) which contains: original CCD pixels 13 (marked by an X), missing pixels 14 (white color), interpolated pixels 16 (red color), and pixels that are being processed 17 (gray color).
Figure 7B:
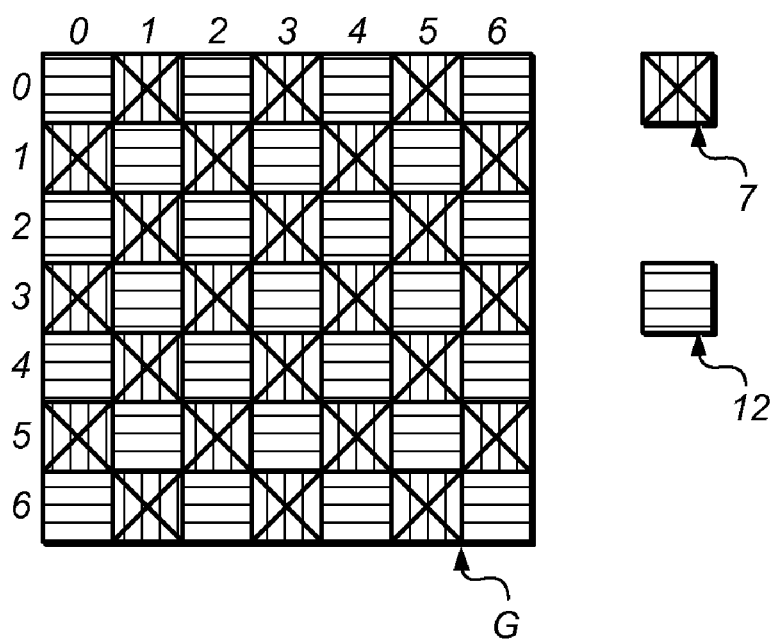
FIG. 7B also shows the interpolated green channel (G) with the original pixels 7 and the interpolated pixels 12.

FIG. 7A shown the red channel (R), which includes: original CCD pixels 13 marked by an X, missing pixels 14 shown as white, interpolated pixels 16 shown shaded, and the pixel being processed 17 shown as gray. FIG. 7B also shows the interpolated green channel (G) with the original pixels 7B and the interpolated pixels 12, where the red channel is now quincunx sampled. The next step is to interpolate pixel 17 at location (3,4). This is presented next.

Estimate Local Edge Direction EW and NS (19) and Interpolate EW or NS (22)

To interpolate pixel 17, the edge direction at location G(3, 4) is estimated in step (19) and then used for interpolating the R-G image. Without loss of generalization, assume the algorithm must now interpolate the difference image R-G at index location (3,4) and that the interpolation is in the EW direction. The linear interpolation of R-G in the EW direction is:

$$R(3,4) - G(3,4) = \frac{R(3,3) - G(3,3)}{2} + \frac{R(3,5) - G(3,5)}{2} \quad \text{(E-21)}$$

$$R(3,4) = \frac{R(3,3) - G(3,3)}{2} + \frac{R(3,5) - G(3,5)}{2} + G(3,4) \quad \text{(E-22)}$$

Similarly, if the interpolation direction is NS then $$R(3,4) = -\frac{G(2,3) - R(2,3)}{2} - \frac{G(4,4) - R(4,4)}{2} + G(3,4) \quad \text{(E-23)}$$

Optional: Correct R, G, and B

The green channel is roughly equivalent to luminosity and since objects tend to be of one color under uniform lighting, edges within objects are enhanced by luminosity. Removing the luminosity component takes away from the sharpness of edges. For this reason the algorithm presented in this invention interpolates the low-pass difference images R-G and B-G. If we accept the fact that R-G and B-G is approximately constant within an object, then so must be the difference G-R and G-B. Forcing this constraint can remove some of the color artifacts. The flowchart for correcting the G plane is described in FIG. 8, while the correction for the B and R planes is described in FIG. 9.

Referring to FIG. 8 the algorithm starts with the G-R image, estimates the local edge direction in step (28) in EW, NE, NS, NW, interpolates in the direction of the local edge in the G-R image in step (29), and then adds back the red channel to obtain the $G_R$ version of the green channel. On the bottom branch the algorithm starts off with G-B, estimates the local edge direction (28), interpolates in the direction of the local edge (29), and finally adds back the blue channel to obtain the $G_B$ version of the green channels. Finally, the $G_R$ and $G_B$ channels are averaged out (35) to obtain the new green channel $G_{NEW}$.

On the top branch of FIG. 9 the algorithm starts off with R-$G_{NEW}$, estimates the local edge direction (28), interpolates in the direction of the local edge (29), and finally adds back the $G_{NEW}$ channel to obtain the $R_{NEW}$ version of the blue channel. The process is very similar for the $B_{NEW}$ channel.

The estimation of the local edge direction in step (28) and the interpolation in the estimated direction is very similar to steps (18) and (20). For completion they are described next.

Fine Model Fit EW, NE, NS, NW (28)

The estimation of the local edge direction (28) applies to any image patch, regardless of the color. For discussion purposes, the process of estimating the local direction of any pixel is described with reference to FIG. 10, which depicts a local patch of an image, with pixel 50 at location (3,3) being the pixel the algorithm is currently processing.

The first step is to estimate the interpolation errors in the directions EW, NE, NS, and NW at the nine pixels in the local neighborhood. For example, at pixel P(2,2) the errors are:

$$EWE(2,2) = abs(P(2,1) + P(2,3) - 2 \times P(2,2)) \quad \text{(E-24)}$$

$$NEE(2,2) = abs(P(1,3) + P(3,1) - 2 \times P(2,2)) \quad \text{(E-25)}$$

$$NSE(2,2) = abs(P(1,2) + P(3,2) - 2 \times P(2,2)) \quad \text{(E-26)}$$

$$NWE(2,2) = abs(P(1,1) + P(3,3) - 2 \times P(2,2)) \quad \text{(E-27)}$$

and similarly, for the pixels at locations (2,3), (2,4), (3,2), (3,3), (3,4), (4,2), (4,3), and (4,4). The error at pixel P(3,3) is then:

$$EWE(3,3) = \sum_{i=2}^{4} \sum_{j=2}^{4} EWE(i,j) \quad \text{(E-28)}$$

$$NEE(3,3) = \sum_{i=2}^{4} \sum_{j=2}^{4} NWE(i,j) \quad \text{(E-29)}$$

$$NSE(3,3) = \sum_{i=2}^{4} \sum_{j=2}^{4} NSE(i,j) \quad \text{(E-30)}$$

$$NWE(3,3) = \sum_{i=2}^{4} \sum_{j=2}^{4} NWE(i,j) \quad \text{(E-31)}$$

Finally, the estimated edge direction (ED(3,3)) is:
SWITCH(min(EWE(3,3),NEE(3,3),NSE(3,3),NWE(3,3)))
CASE EWE
   ED(3,3)=EW
CASE NEW
   ED(3,3)=NE
CASE NSE
   ED(3,3)=NS
CASE NWE
   ED(3,3)=NW Once the edge direction is determined, interpolation is straight-forward.

Interpolate in EW, or NE, or NS, or NW Direction (29)

This is simply a linear interpolation in the direction given by ED(3,3). For example, if ED(3,3)=EW then $$P(3,3) = \frac{P(3,2) + P(3,4)}{2} \quad \text{(E-32)}$$

and similarly for all the other directions.

An edge directed demosaicing algorithm has been described. The algorithm may be executed by a processor (CPU or DSP) of any type of electronic device that processes images captured with a CCD and CFA. Not only is the algorithm of the present invention more accurate than prior demosaicing algorithms that use gradients to find edges, the present algorithm is also faster because the algorithm can be implemented using convolution and requires only shifts, adds, and no multiplications or divisions.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A computer-implemented method for determining from an input color filter array (CFA) sampled image, an edge direction, the method comprising:
a computer system implementing:
calculating for a current missing green pixel, interpolation errors in an East-West (EW) direction at known neighboring green pixels, and averaging the EW interpolation errors to obtain an EW error, wherein averaging the EW interpolation errors comprises summing the EW interpolation errors and dividing a resultant sum by a number of EW interpolation errors summed together to obtain an EW error;
calculating for the current missing green pixel, interpolation errors in a North-South (NS) direction at known neighboring green pixels, and averaging the NS interpolation errors to obtain a NS error; and
selecting a direction indicated by a minimum of the EW error and the NS error as the edge direction;
wherein the edge direction is useable to interpolate pixels in an image, wherein the computer system is configured to display the image on a display of the computer system.

2. The method of claim 1 wherein the edge direction and the sampled image, which includes a green channel (G) of green pixels, a red channel (R) of red pixels, and a blue channel (B) of blue pixels, are used to interpolate missing green pixels at red and blue locations in the green channel by:
for the missing green pixel, interpolating a difference image comprising the G-B if the missing green pixel is in a blue location, or G-R if the missing green pixel is in a red location, in the edge direction;
in the blue channel, estimating missing blue pixels in green pixel locations using linear interpolation of the blue pixels in the blue channel in the edge direction; and
in the red channel, estimating the missing red pixels in green pixel locations using linear interpolation of the red pixels in the red channel in the selected direction, thereby providing an interpolated full green channel in which all missing green pixels have an interpolated value.

3. A non-transitory computer-readable storage medium comprising program instructions for determining from an input color filter array (CFA) sampled image, an edge direction, wherein the program instructions are computer-executable to implement a method for:
calculating for a current missing green pixel, interpolation errors in an East-West (EW) direction at known neighboring green pixels, and averaging the EW interpolation errors to obtain an EW error, wherein averaging the EW interpolation errors comprises summing the EW interpolation errors and dividing a resultant sum by a number of EW interpolation errors summed together to obtain an EW error;
calculating for the current missing green pixel, interpolation errors in a North-South (NS) direction at known neighboring green pixels, and averaging the NS interpolation errors to obtain a NS error; and
selecting a direction indicated by a minimum of the EW error and the NS error as the edge direction.

4. The non-transitory computer-readable storage medium of claim 3 wherein the program instructions are further executable to implement a method for using the edge direction and the sampled image, which includes a green channel (G) of green pixels, a red channel (R) of red pixels, and a blue channel (B) of blue pixels, to interpolate missing green pixels at red and blue locations in the green channel by:
for the missing green pixel, interpolating a difference image comprising the G-B if the missing green pixel is in a blue location, or G-R if the missing green pixel is in a red location, in the edge direction;
in the blue channel, estimating missing blue pixels in green pixel locations using linear interpolation of the blue pixels in the blue channel in the edge direction; and
in the red channel, estimating the missing red pixels in green pixel locations using linear interpolation of the red pixels in the red channel in the edge direction, thereby providing an interpolated full green channel in which all missing green pixels have an interpolated value.

5. An electronic device, comprising:
an input color filter array (CFA) for filtering light at a time of image capture;
a charge coupled device (CCD) for sensing the filtered light to produce a sampled image;
a processor for processing the sampled image; and
an edge directed demosaicing algorithm executed by the processor for:
calculating for a current missing green pixel, interpolation errors in an East-West (EW) direction at known neighboring green pixels, and averaging the EW interpolation errors to obtain an EW error, wherein averaging the EW interpolation errors comprises summing the EW interpolation errors to obtain an EW error without dividing a resultant sum by a number of EW interpolation errors summed together;
calculating for the current missing green pixel, interpolation errors in a North-South (NS) direction at known neighboring green pixels, and averaging the NS interpolation errors to obtain a NS error; and
selecting a direction indicated by a minimum of the EW error and the NS error as the edge direction.

6. The electronic device of claim 5 wherein the selected edge direction, the sampled image, which includes a green channel (G) of green pixels, a red channel (R) of red pixels, and a blue channel (B) of blue pixels, are used to interpolate missing green pixels at red and blue locations in the green channel by:
for the missing green pixel, interpolating a difference image comprising the G-B if the missing green pixel is in a blue location, or G-R if the missing green pixel is in a red location, in the selected edge direction;
in the blue channel, estimating missing blue pixels in green pixel locations using linear interpolation of the blue pixels in the blue channel in the selected edge direction; and
in the red channel, estimating the missing red pixels in green pixel locations using linear interpolation of the red pixels in the red channel in the selected direction, thereby providing an interpolated full green channel in which all missing green pixels have an interpolated value.

7. A non-transitory computer-readable storage medium, comprising program instructions, wherein the program instructions are computer-executable to determine an edge direction for a known plurality of pixels in a sampled image, in which each known pixel in the known plurality of pixels represents one of a first type pixel, a second type pixel, or a third type pixel, and wherein the edge direction is operable to be used as an interpolation direction to determine, for a current known second type pixel or third type pixel of the known plurality of pixels, an associated interpolated first type pixel, the program instructions being executable to:

calculate, for the current known pixel of the known plurality of pixels, an interpolation error in an East-West (EW) direction of a known neighboring first type pixel, wherein the interpolation error in the EW direction corresponds to a sum of (a known first type pixel west of the known neighboring first type pixel and a known first type pixel east of the known neighboring first type pixel) minus two times the known neighboring first type pixel;

calculate, for the current known pixel of the known plurality of pixels, an interpolation error in a North-South (NS) direction of a known neighboring first type pixel; and select an EW direction for the edge direction if the interpolation error in the EW direction is less than the interpolation error in the NS direction or select a NS direction for the edge direction if the interpolation error in the NS direction is less than the interpolation error in the EW direction.

8. The non-transitory computer-readable storage medium of claim 7, wherein the first type pixel is a green pixel, the second type pixel is a blue pixel, and the third type pixel is a red pixel.

9. The non-transitory computer-readable storage medium of claim 7, wherein the interpolation error in the NS direction corresponds to a sum of (a known first type pixel north of the known neighboring first type pixel and a known first type pixel south of the known neighboring first type pixel) minus two times the known neighboring first type pixel.

10. The non-transitory computer-readable storage medium of claim 7, wherein calculating an interpolation error in the EW direction for the current known pixel comprises calculating interpolation errors in the EW direction for at least two known neighboring first type pixels and summing the calculated interpolation errors in the EW direction to derive a cumulative interpolation error in the EW direction;

wherein calculating an interpolation error in the NS direction for the current known pixel comprises calculating interpolation errors in the NS direction for at least two known neighboring first type pixels and summing the calculated interpolation errors in the NS direction to derive a cumulative interpolation error in the NS direction; and wherein selecting the edge direction comprises selecting an EW direction for the edge direction if the cumulative interpolation error in the EW direction is less than the cumulative interpolation error in the NS direction or selecting a NS direction for the edge direction if the cumulative interpolation error in the NS direction is less than the cumulative interpolation error in the EW direction.

11. The non-transitory computer-readable storage medium of claim 7, wherein calculating an interpolation error in the EW direction for the known current pixel comprises calculating interpolation errors in the EW direction for at least two known neighboring first type pixels and averaging the calculated interpolation errors in the EW direction to derive an averaged interpolation error in the EW direction;

wherein calculating an interpolation error in the NS direction for the known current pixel comprises calculating interpolation errors in the NS direction for at least two known neighboring first type pixels and averaging the calculated interpolation errors in the NS direction to derive an averaged interpolation error in the NS direction; and wherein selecting the edge direction comprises selecting an EW direction for the edge direction if the averaged interpolation error in the EW direction is less than the averaged interpolation error in the NS direction or selecting a NS direction for the edge direction if the averaged interpolation error in the NS direction is less than the averaged interpolation error in the EW direction.

12. A computer-implemented method for determining from an input color filter array (CFA) sampled image, an edge direction, the method comprising:

a computer system implementing:

calculating for a current missing green pixel, interpolation errors in an East-West (EW) direction at known neighboring green pixels, and averaging the EW interpolation errors to obtain an EW error, wherein averaging the EW interpolation errors comprises summing the EW interpolation errors to obtain an EW error without dividing a resultant sum by a number of EW interpolation errors summed together;

calculating for the current missing green pixel, interpolation errors in a North-South (NS) direction at known neighboring green pixels, and averaging the NS interpolation errors to obtain a NS error; and selecting a direction indicated by a minimum of the EW error and the NS error as the edge direction;

wherein the edge direction is useable to interpolate pixels in an image, wherein the computer system is configured to display the image on a display of the computer system.

13. A non-transitory computer-readable storage medium, comprising program instructions, wherein the program instructions are computer-executable to determine an edge direction for a known plurality of pixels in a sampled image, in which each known pixel in the known plurality of pixels represents one of a first type pixel, a second type pixel, or a third type pixel, and wherein the edge direction is operable to be used as an interpolation direction to determine, for a current known second type pixel or third type pixel of the known plurality of pixels, an associated interpolated first type pixel, the program instructions being executable to:

calculate, for the current known pixel of the known plurality of pixels, an interpolation error in an East-West (EW) direction of a known neighboring first type pixel;

calculate, for the current known pixel of the known plurality of pixels, an interpolation error in a North-South (NS) direction of a known neighboring first type pixel, wherein the interpolation error in the NS direction corresponds to a sum of (a known first type pixel north of the known neighboring first type pixel and a known first type pixel south of the known neighboring first type pixel) minus two times the known neighboring first type pixel; and select an EW direction for the edge direction if the interpolation error in the EW direction is less than the interpolation error in the NS direction or select a NS direction for the edge direction if the interpolation error in the NS direction is less than the interpolation error in the EW direction.

14. A non-transitory computer-readable storage medium, comprising program instructions, wherein the program instructions are computer-executable to determine an edge direction for a known plurality of pixels in a sampled image, in which each known pixel in the known plurality of pixels represents one of a first type pixel, a second type pixel, or a third type pixel, and wherein the edge direction is operable to be used as an interpolation direction to determine, for a current known second type pixel or third type pixel of the known plurality of pixels, an associated interpolated first type pixel, the program instructions being executable to:

calculate, for the current known pixel of the known plurality of pixels, an interpolation error in an East-West (EW) direction of a known neighboring first type pixel, wherein calculating an interpolation error in the EW direction for the current known pixel comprises calculating interpolation errors in the EW direction for at least two known neighboring first type pixels and summing the calculated interpolation errors in the EW direction to derive a cumulative interpolation error in the EW direction;

calculate, for the current known pixel of the known plurality of pixels, an interpolation error in a North-South (NS) direction of a known neighboring first type pixel, wherein calculating an interpolation error in the NS direction for the current known pixel comprises calculating interpolation errors in the NS direction for at least two known neighboring first type pixels and summing the calculated interpolation errors in the NS direction to derive a cumulative interpolation error in the NS direction; and select an EW direction for the edge direction if the interpolation error in the EW direction is less than the interpolation error in the NS direction or select a NS direction for the edge direction if the interpolation error in the NS direction is less than the interpolation error in the EW direction, wherein selecting the edge direction comprises selecting an EW direction for the edge direction if the cumulative interpolation error in the EW direction is less than the cumulative interpolation error in the NS direction or selecting a NS direction for the edge direction if the cumulative interpolation error in the NS direction is less than the cumulative interpolation error in the EW direction.

15. A non-transitory computer-readable storage medium, comprising program instructions, wherein the program instructions are computer-executable to determine an edge direction for a known plurality of pixels in a sampled image, in which each known pixel in the known plurality of pixels represents one of a first type pixel, a second type pixel, or a third type pixel, and wherein the edge direction is operable to be used as an interpolation direction to determine, for a current known second type pixel or third type pixel of the known plurality of pixels, an associated interpolated first type pixel, the program instructions being executable to:

calculate, for the current known pixel of the known plurality of pixels, an interpolation error in an East-West (EW) direction of a known neighboring first type pixel, wherein calculating an interpolation error in the EW direction for the known current pixel comprises calculating interpolation errors in the EW direction for at least two known neighboring first type pixels and averaging the calculated interpolation errors in the EW direction to derive an averaged interpolation error in the EW direction;

calculate, for the current known pixel of the known plurality of pixels, an interpolation error in a North-South (NS) direction of a known neighboring first type pixel, wherein calculating an interpolation error in the NS direction for the known current pixel comprises calculating interpolation errors in the NS direction for at least two known neighboring first type pixels and averaging the calculated interpolation errors in the NS direction to derive an averaged interpolation error in the NS direction; and select an EW direction for the edge direction if the interpolation error in the EW direction is less than the interpolation error in the NS direction or select a NS direction for the edge direction if the interpolation error in the NS direction is less than the interpolation error in the EW direction, wherein selecting the edge direction comprises selecting an EW direction for the edge direction if the averaged interpolation error in the EW direction is less than the averaged interpolation error in the NS direction or selecting a NS direction for the edge direction if the averaged interpolation error in the NS direction is less than the averaged interpolation error in the EW direction.

* * * * *